United States Patent [19]
Zoland

[11] Patent Number: 5,303,956
[45] Date of Patent: * Apr. 19, 1994

[54] TIME ZONE CONVERSION CHART FOR CARD CASE, LUGGAGE TAG OR KEY CHAIN

[75] Inventor: Martin Zoland, Toorak, Australia

[73] Assignee: Cher (Intl.) Pty. Ltd., Australia

[*] Notice: The portion of the term of this patent subsequent to Jul. 20, 2010 has been disclaimed.

[21] Appl. No.: 95,670

[22] Filed: Jul. 20, 1993

[51] Int. Cl.$^5$ .............................................. B42D 15/00
[52] U.S. Cl. ........................................ 281/31; 283/33; 283/115
[58] Field of Search ................. 281/15.1, 29, 31, 36, 281/37, 42; 283/2, 23–26, 32, 33, 115, 116; 229/68, 72; 235/61, 61 N, 61 D, 61 A; 368/22, 27, 41; 462/6, 71

[56] References Cited

U.S. PATENT DOCUMENTS

| | | | |
|---|---|---|---|
| 2,399,902 | 5/1946 | Wood | 283/23 X |
| 3,970,332 | 7/1976 | Alford, Jr. | 281/31 |
| 4,051,996 | 10/1977 | Ross et al. | 281/31 X |
| 4,890,728 | 1/1990 | Grimsley | 281/31 X |
| 5,228,722 | 7/1993 | Zoland | 281/15.1 X |

FOREIGN PATENT DOCUMENTS

| | | | |
|---|---|---|---|
| 2260973 | 6/1973 | Fed. Rep. of Germany | 283/23 |
| 2602182 | 2/1988 | France | 283/23 |
| 1251425 | 10/1971 | United Kingdom | 283/23 |

*Primary Examiner*—Peter Dungba Vo
*Attorney, Agent, or Firm*—Blakely, Sokoloff, Taylor & Zafman

[57] ABSTRACT

The present invention is directed to a travel document folder, such as an airline ticket folder, U-rail pass folder, passport holder, card case, luggage tag, key chain or the like, having a time zone conversion chart rotatably mounted to one leaf of the folder or to the card case or luggage tag. In the preferred embodiment, the time zone conversion chart is made from mounting an inner dial to an outer dial such that the two dials share a common spindle and are arranged concentrically. A time scale in units of hours is provided on the outer dial, while geographic location divisions are provided on the inner dial. Cities around the world that are located in a common time zone are then grouped and assigned to the geographic location divisions. By rotating a local city on the inner dial into alignment with a time on the outer dial, a local reference time is established. Then by moving around the inner dial to find the desired city, it is possible to look up the local time there by reading off the outer dial the particular hour that is aligned with the desired city. In the preferred embodiment, the outer dial is imprinted into the leaf of the travel document folder.

15 Claims, 3 Drawing Sheets

TIME ZONE CONVERSION CHART FOR CARD CASE, LUGGAGE TAG OR KEY CHAIN

BACKGROUND OF THE INVENTION

1. Field of the Invention

The present invention relates to a travel document folder, card case or luggage tag used by travelers. More precisely, the present invention relates to a travel document folder such as a passport holder, U-rail pass carrier, airline ticket folder, luggage tag, card case with or without a key attachment mechanism or the like having a time zone conversion chart rotatably mounted to the folder, tag or case for convenient conversion of local time from one time zone to another.

2. Description of the Prior Art and Related Information

Since the advance of transportation technology, the world has become a smaller place. Indeed, travel between continents is an everyday occurrence for many business people. Regardless of whether it is by plane, ship, or train, distances traversed today are much greater than in years gone by due in part to the high speeds at which these vessels travel. Because distances covered are so vast, it is inevitable that during the course of a trip a traveler may have to change time zones. To be sure, for international business travelers changing time zones is a common occurrence. Even traveling across the United States from Los Angeles to New York requires crossing three times zones; namely, from Pacific to Mountain to Central to Eastern time zones. For active travelers who must constantly change time zones, it can be a nuisance to mentally estimate the correct time zone at the destination. For business travelers who have to schedule meetings, proper calculation of local time is crucial to coordinate personnel who are in remote locales.

There have been efforts in the prior art to simplify the active traveler's task. One such device electronically performs the time zone conversion. The circuitry is adapted to a two-dimensional map of the world that is touch sensitive. By pressing down on different parts of the map to indicate the specific geographic location, the user triggers a microprocessor that calculates the local time at the touched location. Unfortunately, such a device is expensive. Also being electronic, the device requires batteries to operate. Finally, just remembering to bring the device along on trips limits its usefulness.

Some specialized digital wristwatches have an electronic time zone conversion feature. Other wristwatches rely on a rotating bezel to perform the time zone conversion. But buying a wristwatch specifically for its time conversion feature may not always be appropriate.

Therefore, a need presently exists for providing a means of converting local time in one time zone to another. It is desirable that this device be conveniently located for easy access by the frequent traveler.

SUMMARY OF THE INVENTION

The present invention relates to a travel document folder, card case or luggage tag that features a time zone conversion chart. In a preferred embodiment, the conversion chart is assembled from two dials rotatably mounted to a common spindle. A scale on the outer dial marks out the time in units of one hour increments on a 12-hour or 24-hour scale. The inner dial has divisions located around the circumference with each division being assigned the names of cities located in the same time zone. To operate, one simply rotates the inner dial until the city that he is in aligns with the time at that location. Then by looking to other cities on the inner dial, the numeral directly opposite that city indicates the desired city's local time.

Advantageously, the present invention time zone conversion chart is incorporated into a travel document folder such as a passport holder, U-rail pass holder, airline ticket folder, etc. According to the preferred embodiment of the present invention, the outer dial can be imprinted onto the inner leaf of the passport holder or ticket folder, for example. The inner dial, made from paper or the like, is tacked to the outer dial in a concentric manner. This form of fabrication is inexpensive, yet the utility of such an added feature in a passport holder or ticket folder is immeasurable. Indeed, such a conversion chart could be incorporated into every airline ticket folder, thereby giving the long-distance traveler convenient access to the time zone conversion chart.

As noted above, since the chart is fabricated from paper and ink, the manufacturing costs are low. Consequently, after the trip the traveler can simply discard the airline ticket holder including the chart.

Higher quality conversion charts may be fabricated from plastic and incorporated into a reusable travel document folder such as a passport holder. Since the traveler intends to take his passport folder with him on numerous trips, the time zone conversion chart integrated into the folder has a longer useful life.

In sum, it is clear that the present invention is much more useful and convenient than the electronic conversion devices mentioned above. Indeed, the traveler cannot forget to bring the conversion chart along since in some instances it is provided by the airline in its ticket folder; or in other instances it is integrated into his passport folder.

DETAILED DESCRIPTION OF THE INVENTION

In the following description, numerous details such as specific materials and configurations are set forth in order to provide a more complete understanding of the present invention. But it is understood by those skilled in the art that the present invention can be practiced without those specific details. In other instances, well-known elements are not described explicitly so as not to obscure the disclosure.

The present invention relates to a document folder or card case having a time zone conversion feature that easily and conveniently converts local time in one time zone to local time in another time zone. In a preferred embodiment, the time zone conversion feature is embodied in twin dials rotatably mounted to each other on a common spindle.

Figure 1:
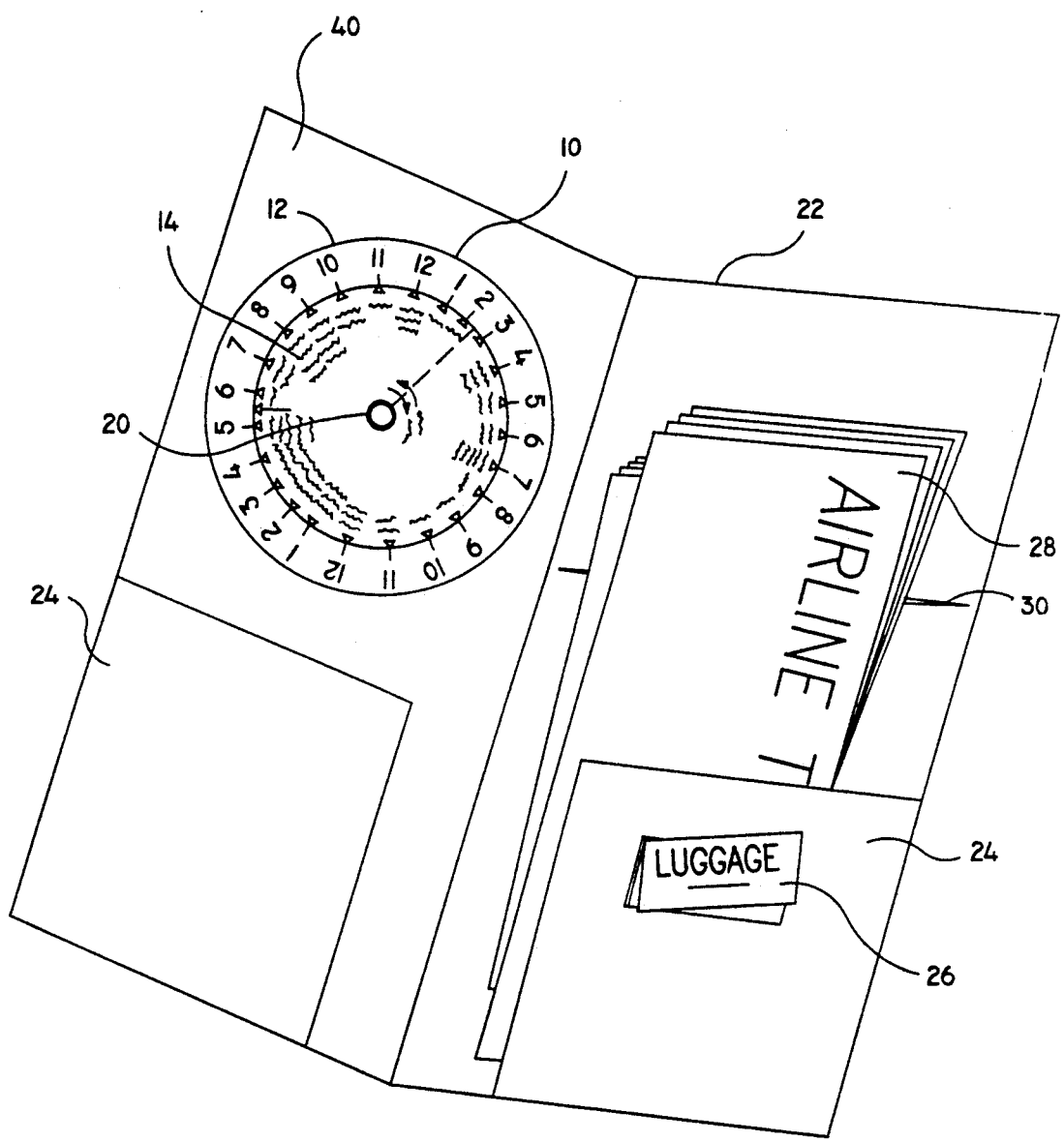
FIG. 1 provides a perspective view of a travel document folder according to the present invention having a time zone conversion chart coupled to one leaf.

FIG. 1 provides a perspective view of a preferred embodiment of the present invention. More precisely, FIG. 1 shows a travel document folder 22 opened like a book. In this example, the travel document folder 22 is an airline ticket folder given out by all airlines when their tickets are issued to the traveler.

Clearly, the present invention is equally adaptable to other forms of travel document folders such as a passport folder, a U-rail pass, etc. For those who travel frequently, the travel document folder 22 shown in FIG. 1 is a familiar sight, being formed by two leaves 40 joined at a common edge. Each leaf 40 has its own inner pocket 24 for carrying travel paraphernalia. Such paraphernalia include airline tickets 28, a trip itinerary, boarding passes, etc. Usually a slot 30 is provided in one leaf 40 through which a boarding pass can be inserted, thereby exposing the top half of the boarding pass. This feature is used by the airlines when they staple the airline ticket to the boarding pass, and the two documents extend through the slot. The passenger then approaches the stewardess before boarding and presents the travel document folder 22 for ticket collection. As a common practice, luggage claim tags 26 are typically attached to the inner pockets 24, too.

The present invention incorporates those conventional features as well as providing a time conversion chart 10. The chart 10 provides an easy, reliable, and readily accessible means for the passenger or traveler to convert local time in one time zone to local time in another time zone. To accomplish this, the preferred embodiment shown in FIG. 1 features an outer dial 12 concentrically mounted to an inner dial 14 on a common spindle 20. The spindle 20 can be made from any light-weight and inexpensive metal or plastic, fabricated into a rivet to hold the two dials to the leaf 40. It is critical that one dial be free to rotate relative to the other. The dials 12 and 14 can be fabricated from paper, cardboard, plastic, or any similar material known in the art. In the preferred embodiment, the images on the outer dial 12 are simply printed directly on the leaf 40. By printing the outer dial 12 on the leaf 24, fabrication costs for the time zone conversion chart 10 and the overall travel document folder 22 decrease significantly since only the inner dial is fabricated and assembled to the leaf 40. The inner dial 14, of course, rotates as before about spindle 20.

Depending upon specific application, the time zone conversion chart 10 can be made to varying degrees of quality. Since in the preferred embodiment the travel document folder 22 is intended for a disposable airline ticket folder, there should not be a great expense invested in fabricating the chart 10. On the other hand, if the travel document folder 22 is a passport holder, the time zone conversion chart 10 should preferably be fabricated from plastic or laminated paper to improve durability since the passport folder is be used over and over.

The present invention time zone conversion chart 10 can be disposed not just inside the leaf 40, as shown in FIG. 1. Alternatively, the time zone conversion chart can be placed on the front or back cover. The time zone conversion chart can also be made to different sizes to complement the proportions of the travel document folder. In another alternative embodiment, the inner dial and outer dial are discrete disks capable of being rotated independently so that the markings on each dial can be moved to an upright position for convenient reading.

Figure 2:
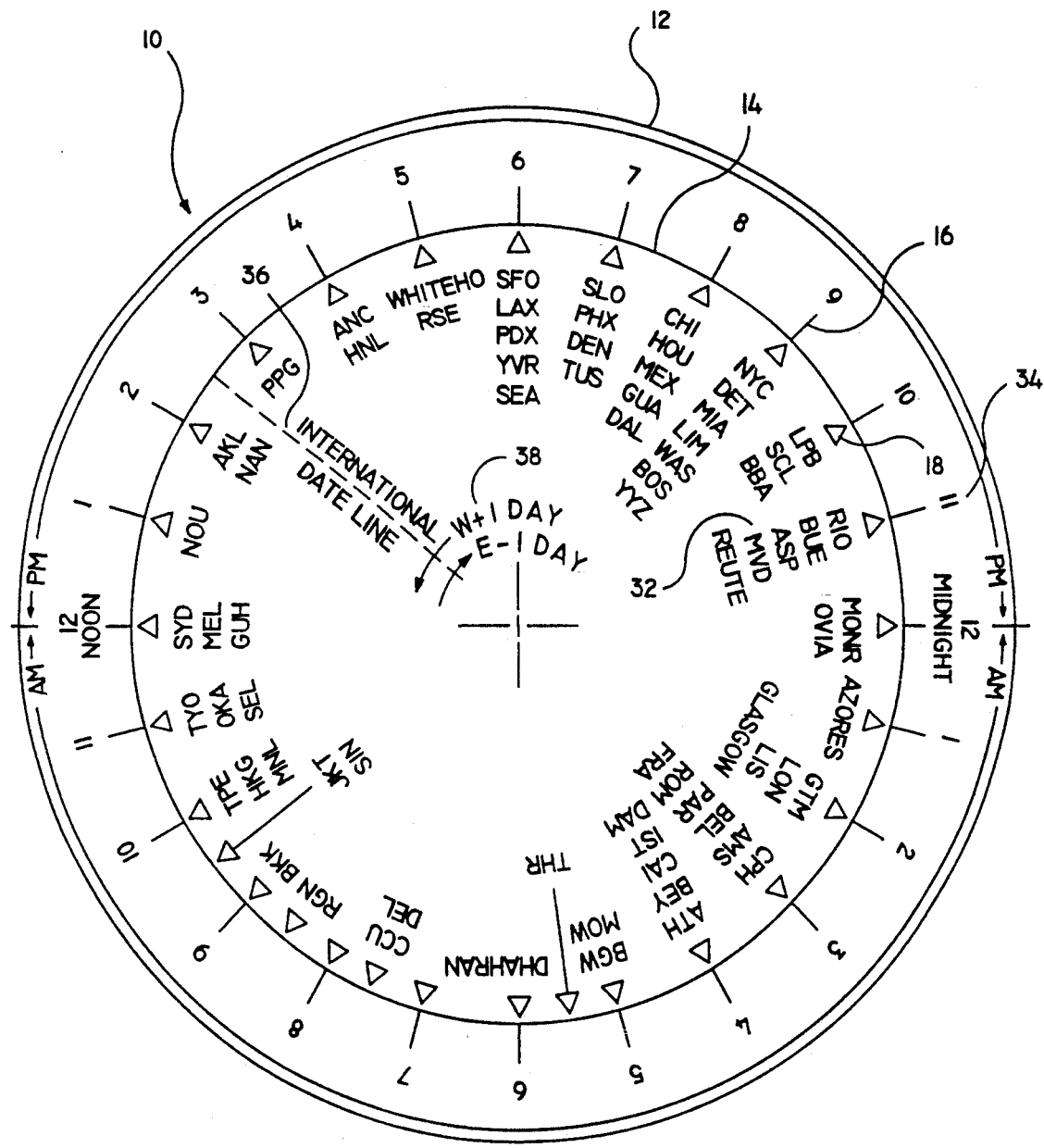
FIG. 2 is an enlarged view of the time zone conversion chart shown in FIG. 1.

FIG. 2 is an enlarged view of the time zone conversion chart 10 shown in FIG. 1. The chart 10 has an inner dial 14 disposed concentric with an outer dial 12, rotatably mounted on a common spindle (not shown) allowing relative rotation between the two dials. The scale marked out on the outer dial 12 is in units of hours, split into 12 hours AM and 12 hours PM. Obviously, a 24-hour military time scale is also possible. At each hour numeral 34 is a time division marker 16 oriented radially.

On the inner dial 14 around its circumference are geographic location division markers 18 to which are assigned names of different cities around the world. These city names 32 are grouped according to their geographic location with those cities sharing a common local time zone being grouped together in one column. Therefore, west coast cities such as San Francisco, Los Angeles, Seattle are grouped together in a single column since they are all in the Pacific Time Zone. Likewise, cities such as Chicago, Houston, Dallas, are grouped together because they are in the Central Time Zone. This grouping process is repeated for various major cities around the globe.

To convert local time in one time zone to local time in another, the time zone conversion chart 10 is operated as follows. If a traveler is located in San Francisco, for example, he should locate the name of that city on the inner dial 14. In FIG. 2, that city is listed in shorthand as SFO. Assuming the local time at the city is 6:00 PM, either dial can be rotated so that 6:00 PM on the outer dial 12 aligns with the geographic location division 18 assigned to San Francisco on the inner dial 14. This alignment condition establishes a reference point for the following conversion step.

Next assume that the traveler has a destination of or wants to know the local time in Tokyo, Japan. This geographic location is listed as TYO on the inner dial 14. The traveler locates this city on the dial 14 and looks to see the hour numeral 34 directly across therefrom. In this case, the time in Tokyo is 11:00 AM. But Tokyo is one day ahead in time relative to San Francisco. That is, if the traveler takes a plane heading west, he must add one day when he crosses the International Date Line. (If he heads east, he must subtract a day.) This makes sense since the earth rotates west to east and places east of the United States are ahead in time.

Consequently, on the chart 10, the International Date Line 36 is shown and a reminder icon 38 is provided on the inner dial 14 to help the traveler make this day adjustment. So in the example above, if the traveler is in San Francisco at 6:00 PM, Monday night, he reads counterclockwise on the inner dial 14 to move him to 11:00 AM in Tokyo. Since he crosses the International Date Line 36, he must follow the icon 38 and add one day, obtaining 11:00 AM Tuesday morning.

On the other hand, the traveler can also read clockwise on the inner dial 14, starting at 6:00 PM, Monday night in San Francisco. As he moves clockwise, he loses time. Eventually, he crosses 12 o'clock midnight which advances him into the next day, which is Tuesday. Continuing on clockwise, he reaches the Tokyo geographic location division 18. The time indicated is 11:00 AM, Tuesday morning, Tokyo time. Consequently, the time zone conversion chart 10 obtains the same result regardless of whether a clockwise direction or a counterclockwise direction is followed.

It is possible to modify the time zone conversion chart shown in FIG. 2. For instance, the hour time divisions can be located on the inner dial instead of the outer dial, while the geographic location divisions are switched to the outer dial. Furthermore, since the time divisions on the outer dial are divided into units of an hour, the traveler using the chart must round his local time to the nearest hour. It is clear, however, that a more precise time conversion is possible by subdividing the hour units into quarter hour units or minute units.

Figure 3:
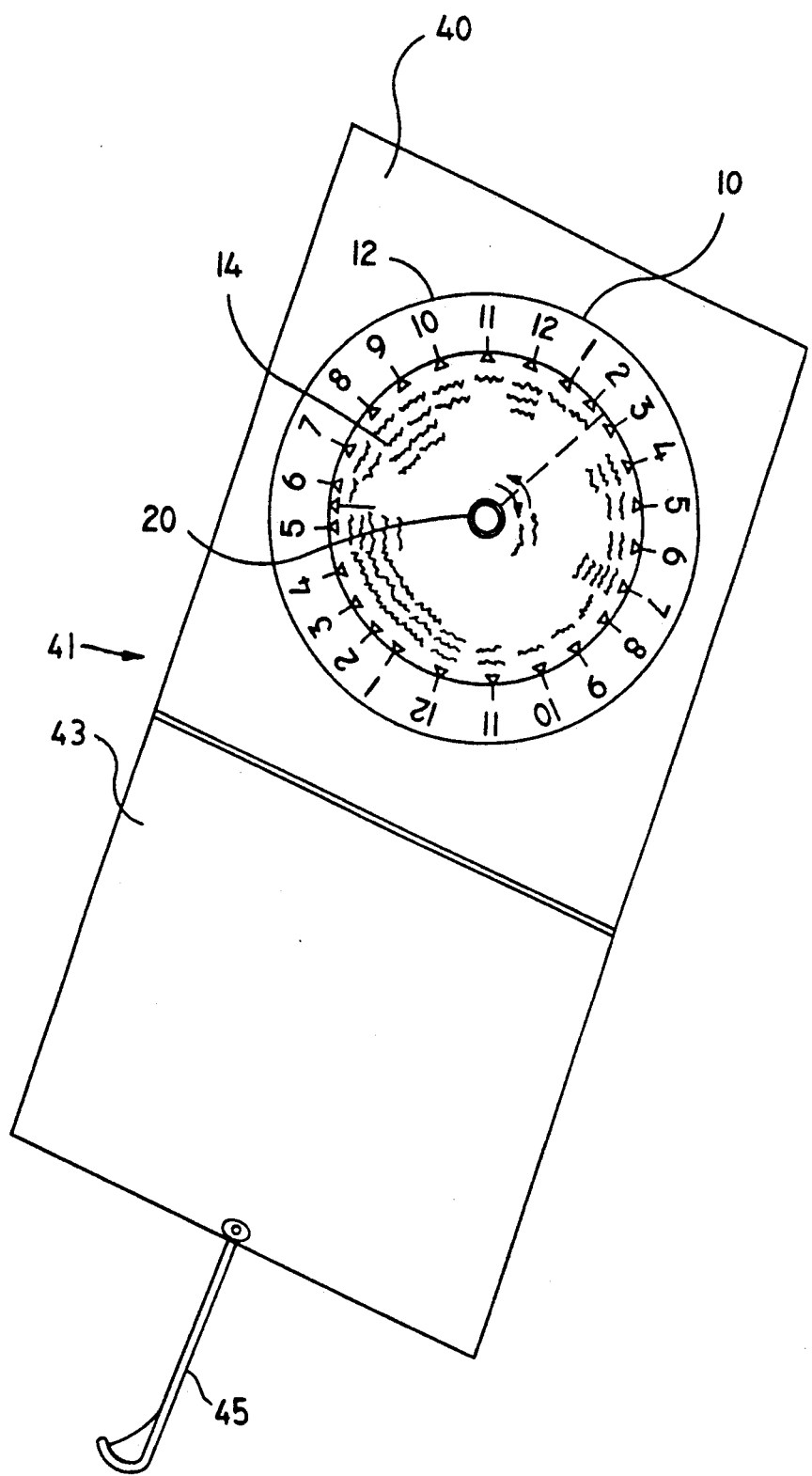
FIG. 3 is a perspective view of a card case or luggage tag with optional key attachment mechanism according to the present invention having a time zone conversion chart coupled thereto.

In an alternate embodiment, the present invention may be implemented using a flat, relatively thin leaf suitable for use as a card or key carrying case with an optional clip for holding a key such as a hotel key or car key. In this embodiment, which may be referred to as a card case, it may also be used as a luggage tag in which case there would need to be a clip or other attachment mechanism for attachment to a piece of luggage. For example, referring to FIG. 3, the invention may be implemented using a rectangular shaped leaf 41 having a pocket 43 into which a hotel key or card may be inserted. The key may be an ordinary metallic key or a flat card key with a magnetic stripe or other mechanism for encoding a key for allowing entry into a room. The specific details of such a key are well known and do not form part of the invention. A clip mechanism 45 may be attached to one end of the card case. The clip may be any suitable mechanism for attaching a key chain, regular hotel key or car key including a rental car key. Alternatively, the attachment mechanism may be one suitable for attaching to the handle of a piece of luggage in which case the card case may be used as a luggage tag. Of course, in this embodiment, the card case would need to be arranged so that a card or other member could be inserted into the case having an owner identification or other desired writing included thereon. In FIG. 3, the pocket 43 is shown on the same side of the leaf as the time zone wheel. However, the invention is not so restricted and the pocket may be on the other side of the leaf.

In sum, when the time zone conversion chart is incorporated into a travel document folder or card case according to the present invention, its utility and convenience to a long-distance traveler are apparent. Since the present invention can be made with low fabrication costs and incorporated into a variety of travel document folders, the potential demand in the marketplace for such a device is unquestionably great.

What is claimed is:

1. A card case having a time zone conversion feature that converts a first time in a first time zone to a second time in a second time zone, the card case comprising:
    a leaf; and
    a time zone conversion chart, coupled to the leaf, having an outer dial rotatably connected concentrically to an inner dial, wherein the outer dial has first divisions and the inner dial has second divisions, the first and second divisions being arranged on the dials in a manner such that one dial can be rotated relative to the other dial to align the first divisions with the second divisions thus obtaining a first pair of aligned first and second divisions that indicates the first time in the first time zone and a second pair of aligned first and second divisions that indicates the second time in the second time zone.

2. A card case according to claim 1, wherein the second divisions are time divisions in increments of hours, and the first divisions are assigned names of geographic locations.

3. A card case according to claim 1 further comprising an attachment mechanism for coupling the card case to at least one of a room key and a car key.

4. A card case defined by claim 1 further comprising a pocket suitable for holding at least one of a room key card, a room key and an identification card.

5. A card case according to claim 1, wherein the card case is a luggage tag.

6. A card case according to claim 5 further comprising an attachment mechanism for coupling the card case to a piece of luggage.

7. A card case according to claim 1, wherein the first divisions are time divisions in increments of hours, and the second divisions are assigned names of geographic locations.

8. A card case according to claim 7, wherein the outer dial is imprinted on the leaf.

9. A card case according to claim 7, wherein the inner and outer dials are rotatably attached by a rivet.

10. A card case according to claim 7, wherein the names of the geographic locations correspond to city names.

11. A card case according to claim 10, wherein the inner dial further contains a radially extending line indicating an international date line.

12. A card case according to claim 11, wherein the time divisions have subdivisions in increments of minutes.

13. A card case according to claim 11, wherein the time divisions are based on a 12-hour scale.

14. A card case according to claim 11, wherein the time divisions are based on a 24-hour scale.

15. A card case having a time zone conversion feature that converts a first time in a first time zone at one city to a second time in a second time zone at another city, the card case comprising:
    a leaf; and
    a time zone conversion chart, coupled to the leaf, having an outer dial rotatably connected concentrically to an inner dial, wherein the outer dial has time divisions and the inner dial has city divisions, the time and city divisions being arranged on the dials in a manner such that one dial can be rotated relative to the other dial to align the time divisions with the city divisions thus obtaining a first pair of aligned time and city divisions that indicates the first time in the first time zone at one city and a second pair of aligned first and second divisions that indicates the second time in the second time zone at another city.

* * * * *